United States Patent
Böttcher et al.

(10) Patent No.: US 11,660,943 B2
(45) Date of Patent: May 30, 2023

(54) WIND DEFLECTOR AND SLIDING ROOF SYSTEM

(71) Applicant: Roof Systems Germany GmbH, Dietzenbach (DE)

(72) Inventors: Justus Böttcher, Dietzenbach (DE); Christian Biewer, Dietzenbach (DE); Matthias Helk, Dietzenbach (DE)

(73) Assignee: Roof Systems Germany GmbH, Dietzenbach (DE)

( * ) Notice: Subject to any disclaimer, the term of this patent is extended or adjusted under 35 U.S.C. 154(b) by 0 days.

(21) Appl. No.: 17/507,745

(22) Filed: Oct. 21, 2021

(65) Prior Publication Data

US 2022/0126661 A1 Apr. 28, 2022

(30) Foreign Application Priority Data

Oct. 22, 2020 (DE) ...................... 10 2020 127 892.6

(51) Int. Cl.
*B60J 7/22* (2006.01)
*B60J 7/043* (2006.01)

(52) U.S. Cl.
CPC ..................................... *B60J 7/22* (2013.01); *B60J 7/043* (2013.01)

(58) Field of Classification Search
CPC .......................................................... B60J 7/22
USPC ....................................................... 296/217
See application file for complete search history.

(56) References Cited

U.S. PATENT DOCUMENTS

| | | | |
|---|---|---|---|
| 3,711,150 A | 1/1973 | Perks | |
| 5,609,388 A * | 3/1997 | Hattass | ...................... B60J 7/22 296/217 |
| 7,152,917 B2 * | 12/2006 | Manders | .................... B60J 7/22 296/217 |
| 7,404,599 B2 * | 7/2008 | Fukami | ...................... B60J 7/22 296/217 |
| 8,814,260 B2 | 8/2014 | Boywitt et al. | |
| 2003/0168892 A1 | 9/2003 | Bohm et al. | |
| 2005/0258669 A1 | 11/2005 | Manders | |
| 2013/0175830 A1 | 7/2013 | Boywitt et al. | |
| 2014/0097646 A1 | 4/2014 | Nienkemper | |

FOREIGN PATENT DOCUMENTS

| | | |
|---|---|---|
| CN | 207466322 U | 6/2018 |
| CN | 210000092 U | 1/2020 |
| DE | 102011121402 A1 | 6/2013 |
| DE | 102017101350 B3 | 5/2018 |

\* cited by examiner

*Primary Examiner* — Dennis H Pedder
(74) *Attorney, Agent, or Firm* — Dilworth IP, LLC

(57) ABSTRACT

A wind deflector for a sliding roof system has a pivotable upper bracket in the raised state of the wind deflector, a pivotable lower bracket in the raised state of the wind deflector, a first elastic raising element, and a flow deflecting part which is fastened to central webs of the brackets and bridges the space between the central webs in the raised state of the wind deflector. The flow deflecting part extends obliquely upwards and opposite to the direction of travel between the central webs. The first elastic raising element is associated with the upper bracket and is configured to urge the upper bracket into the pivoted-up position. A sliding roof system is furthermore shown.

15 Claims, 6 Drawing Sheets

WIND DEFLECTOR AND SLIDING ROOF SYSTEM

FIELD OF THE INVENTION

The invention relates to a wind deflector for a sliding roof system and to such a sliding roof system for a motor vehicle.

BACKGROUND

Detailed Description Wind deflectors are known from the prior art which, in the raised state, have a gap to a front edge of a roof cutout in the direction of travel of the motor vehicle. During the movement of the motor vehicle, turbulences and thus an air flow is created which enters this gap.

Depending on the speed of the motor vehicle, this air flow generates an acoustic noise which is perceived as unpleasant by the vehicle occupants of the motor vehicle at higher speeds.

It is therefore the object to provide a wind deflector and a sliding roof system which provide improved acoustics for the vehicle occupants.

SUMMARY

The invention provides a wind deflector for a sliding roof system, having a pivotable upper bracket in the raised state of the wind deflector and a pivotable lower bracket in the raised state of the wind deflector. The brackets each have a central web extending along the front edge of the associated roof cutout. The wind deflector further has a first elastic raising element, and a flow deflecting part which is fastened to the two central webs and bridges the space between the central webs in the raised state of the wind deflector. The raising element extends obliquely upwards and opposite to the direction of travel between the central webs.

The pivotable brackets are movable between a pivoted-up position and a lowered position. The first elastic raising element is associated with the upper bracket and is configured to urge the upper bracket into the pivoted-up position.

The object of the invention is further achieved by a sliding roof system for a motor vehicle. The sliding roof system comprises a wind deflector according to the invention and is inserted into a roof cutout of the motor vehicle.

The invention is based on the basic idea that both the upper bracket and the lower bracket are configured to be pivotable. The pivoting movement of the lower bracket minimizes or even closes the gap between the front edge of the roof cutout and the wind deflector, so that air can no longer flow into this gap. Therefore, the acoustic noise perceived as unpleasant by the vehicle occupants does not occur. Thus, the sliding roof system and the wind deflector improve the acoustics for vehicle occupants of the motor vehicle. Furthermore, due to the pivotable lower bracket, a flow deflecting part can be used which is configured to be narrower in the adjustment direction than in the wind deflectors known from the prior art.

For example, the first elastic raising element is fastened to the upper bracket, in particular in a non-detachable manner.

One aspect of the invention provides that the two brackets have a common pivot axis. In this way, both brackets can be pivoted upwards by the same raising element.

The flow deflecting part may be a wind deflector net. Thus, the flow deflecting part is configured to be stable and space-saving.

For example, the wind deflector net is made of a textile. In this way, the flow deflecting part can be stowed in a compact manner between the upper and the lower bracket in the lowered position of the brackets.

In one configuration, the first elastic raising element is a spring, in particular a leg spring. The spring continuously urges the upper bracket into the pivoted-out position. Therefore, the upper bracket is pivoted out as soon as the sliding roof cover retracts. This means that no release mechanisms are required to additionally initiate the raising movement.

To be able to move both brackets using one raising element, the lower bracket may be coupled to the upper bracket via the flow deflecting part upwards in the pivoting direction and be configured to be pivoted upwards by the urged upper bracket. The flow deflecting part thus simultaneously acts as a mechanical coupling between the two brackets.

Alternatively or additionally, it is conceivable that the wind deflector has a second elastic raising element which is associated with the lower bracket and is configured to urge the lower bracket into the pivoted-up position. Thus, only a smaller force has to be applied by the respective raising element to pivot out the brackets. In any case, however, the brackets are hinged and force-actuated such that in the raised position, the flow deflecting part is stretched between the brackets.

Preferably, the spring force applied by the first raising element is greater than that applied by the second raising element, thus ensuring that when the two brackets are pivoted upwards, primarily the first raising element attempts to set a distance to the second raising element to stretch the flow deflecting part.

In particular, the first raising element is a leg spring which engages both the first bracket and the second bracket to attempt to move them away from each other, i.e., to pivot them away from each other.

For example, the second elastic raising element is fastened to the lower bracket, in particular in a non-detachable manner.

In one configuration of the invention, the wind deflector has a frame, wherein the first and/or the second elastic raising element is/are supported on the frame.

The position of the brackets is unambiguously defined via the frame, and the support during raising is provided in the frame.

For example, the second elastic raising element is supported on or attached to the frame, and the first elastic raising element is supported on the lower bracket. This measure also ensures that the wind deflector may constitute a pre-assembled, self-contained unit in which the positions of the individual parts relative to each other are precisely defined and the force can be introduced into the brackets via the frame and the raising elements.

In general, both elastic raising elements may of course also be supported on the frame.

For example, the frame is a support bracket and/or part of a frame of the sliding roof system.

To precisely define the pivoted-up position of the brackets, the lower bracket may include a stop which abuts on the frame side in the pivoted-up state and defines the positions of the two brackets in which they are moved upwards.

For example, the stop abuts on a corresponding projection of the frame. If changes still need to be made during the test phase, e.g. with regard to the raising height, this can be achieved by making a minimal structural change to the projection only.

In one configuration, the stop is configured to be damping. In this way, on the one hand, an abutment noise of the lower bracket on the frame which may be unpleasant for the vehicle occupants is prevented, and, on the other hand, the forces acting on the frame and the lower bracket and the mountings during the stop element are reduced, so that the durability of the frame and the lower bracket is improved.

For example, in the pivoted-up position, the lower bracket abuts on the underside of the front edge of the roof cutout. Thus, airflow can no longer enter the gap between the roof cutout and the lower bracket.

In one embodiment, the lower bracket directly adjoins the front edge of the roof cutout in the moved-up position opposite to the direction of travel. In this way, no gap can occur between the wind deflector and the roof cutout.

For example, the lower bracket additionally vertically adjoins the outer skin in the area of the front edge. Thus, the airflow simply flows in a flat manner along the outer skin of the roof and along the lower bracket.

To seal the area between the lower bracket and the front edge of the roof cutout in the extended position of the lower bracket, a sealing element may be arranged on the lower bracket, which is arranged between the flow deflecting part and the front edge of the roof cutout in the pivoted-up position of the lower bracket, the sealing element reducing an air flow between the second bracket and the roof cutout.

DETAILED DESCRIPTION

Figure 1:
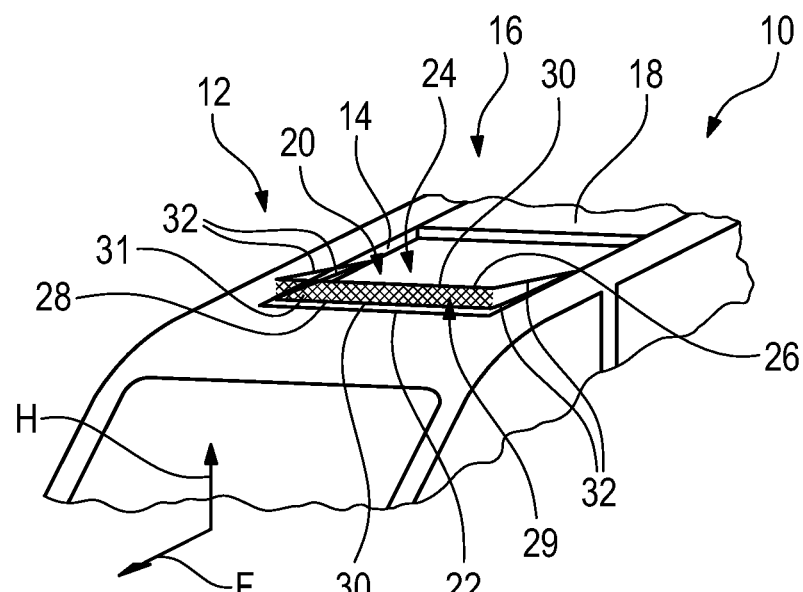
FIG. 1 shows a schematic perspective view of a motor vehicle with a sliding roof system according to the invention.

FIG. 1 shows a motor vehicle 10 in the front area of a roof 12 of the motor vehicle 10. A roof cutout 14 is formed in the roof 12, and a sliding roof system 16 is inserted into the roof cutout 14.

The sliding roof system 16 has a sliding roof cover 18 and a wind deflector 20.

The sliding roof system 16 is shown in the open position, that is, the sliding roof cover 18 is displaced rearwardly in a direction opposite to the direction of travel F, and thus exposes an opening 24 through which a vehicle interior is connected to the vehicle environment.

An actuating element 21 is arranged on the underside of the sliding roof cover 18 (FIG. 2b) and prevents a raising movement of the wind deflector 20 in the closed state of the sliding roof cover 18.

Viewed in the direction of travel F, the wind deflector 20 is arranged in the front area of the roof cutout 14.

More specifically, the wind deflector 20 is adjacent to a front edge 22 of the roof cutout 14 in the direction of travel F of the motor vehicle 10.

The wind deflector 20 includes an upper bracket 26, a lower bracket 28, and a flow deflecting part 29.

In the configuration of FIG. 1, the flow deflecting part 29 is a wind deflector net 31 and is made of a textile, for example.

The flow deflecting part 29 is attached to the upper bracket 26 and the lower bracket 28 and extends over the entire front edge 22.

More specifically, the flow deflecting part 29 is attached to a central web 30 of the upper bracket 26 and to a central web 30 of the lower bracket 28. Here, the central webs 30 extend parallel to the front edge 22 of the roof cutout 14, that is, transversely to the direction of travel F.

At the front and rear ends, each central web 30 merges into a corresponding leg 32, each leg 32 extending opposite to the direction of travel F and being hinged in the area of the roof cutout 14.

Figure 2A:
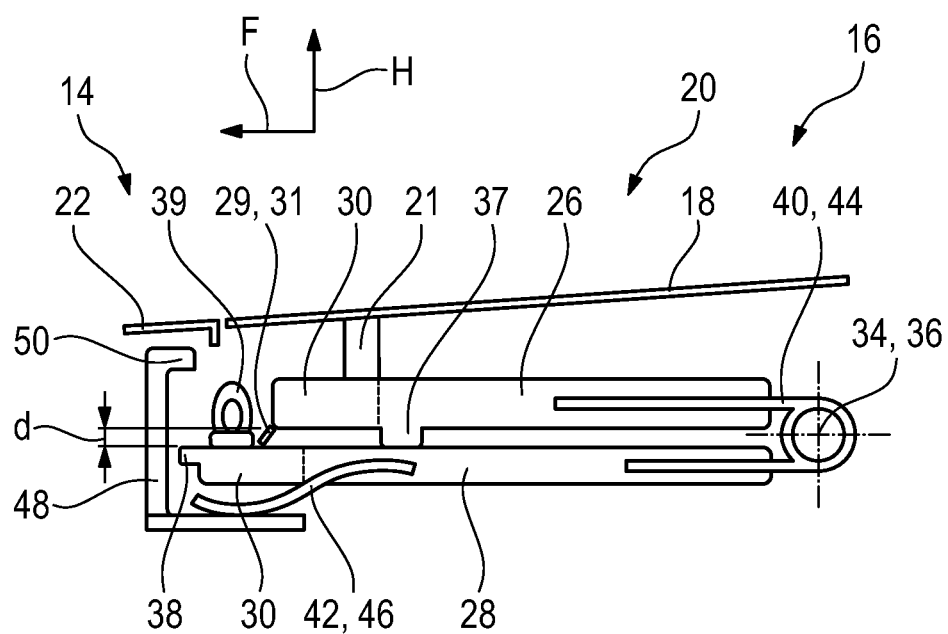
FIGS. 2a and 2b show side views of the sliding roof system of FIG. 1 with a wind deflector according to the invention in a first embodiment in the lowered state and in the raised state.

In other words, the upper bracket 26 has a first pivot axis 34 (FIG. 2a), and the lower bracket 28 has a second pivot axis 36 about which the brackets 26, 28 are each movable, i.e. pivotable, between a pivoted-up and a lowered position. FIG. 2a shows the brackets 26, 28 in the lowered position, and FIG. 2b in the pivoted-up position.

In the embodiment shown, the pivot axes 34, 36 are formed concentrically to each other, so that the upper bracket 26 and the lower bracket 28 have a common pivot axis 34, 36.

In general, the pivot axes 34, 36 may also be different, for example offset from each other in the direction of travel F.

On the side of the upper bracket 26 facing the lower bracket 28, the upper bracket 26 has an extension 37 which extends away from the upper bracket 26 perpendicularly to this side.

This extension 37 is configured so as to ensure a predetermined distance d between the brackets 26, 28 in the lowered position.

In this case, the upper bracket 26 rests on the lower bracket 28, in particular in the area of the extension 37.

At an end of the lower bracket 28 remote from the pivot axis 36, the lower bracket 28 has a stop 38, in particular in the area of the central web 30.

Furthermore, a sealing element 39, in this case a hollow chamber profile, extending in the upward direction H, is arranged between the stop 38 and the fastening region of the flow deflecting part 29 on the lower bracket 28, the sealing element 39 being fastened on the side of the lower bracket 28, lying in front of the upper bracket 26 and pointing upwards.

Figure 2B:
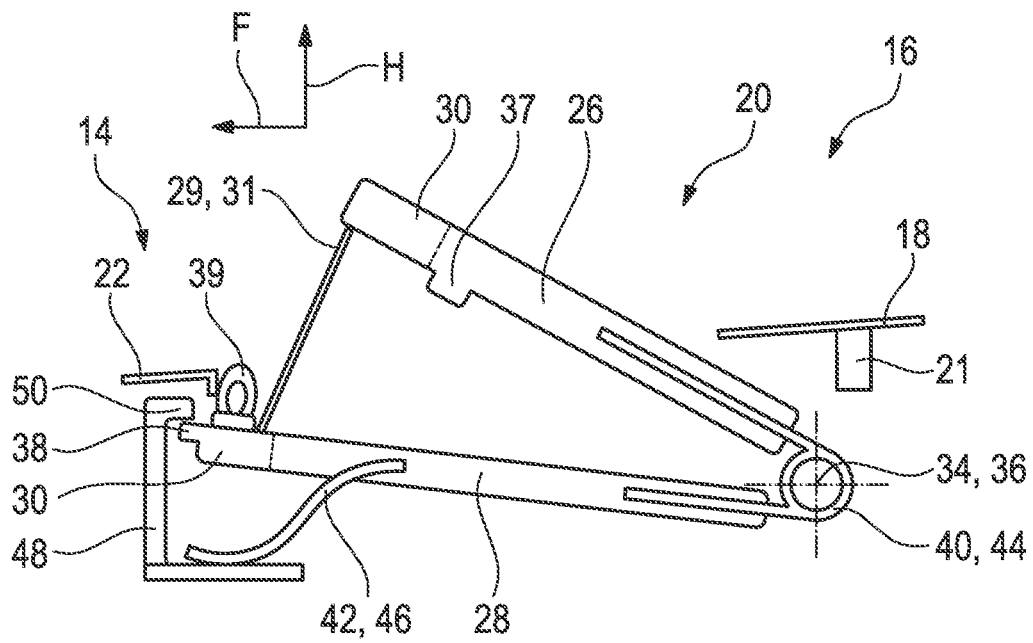

In the side view of FIGS. 2a and 2b, the sealing element 39 has an O-shaped sealing profile.

To generate the pivoting movement of the brackets 26, 28, the wind deflector 20 comprises two elastic, resilient raising elements 40, 42.

Here, the first raising element 40 is associated with the upper bracket 26 and the second raising element 42 is associated with the lower bracket 28.

More specifically, the first elastic raising element 40 is a spring 44, more specifically a leg spring, one of the legs of the spring 44 being connected to the upper bracket 26 and the other leg being connected to the lower bracket 28.

The first raising element 40 urges the upper bracket 26 from the lowered position to the pivoted-up position, that is, in the direction of the upward direction H. The first raising element 40 ensures that the two brackets 26, 28 are biased away from each other in the raised position, so that the flow deflecting part 29 is stretched.

In the embodiment of FIGS. 2a and 2b, the second raising element 42 is an s-shaped curved spring 46 which urges the lower bracket 28 in the upward direction H.

One of the ends of the second elastic raising element 42 is supported on a frame 48 of the wind deflector 20, and the other end of the raising element 42 is attached to the lower bracket 28.

The second raising element 42 serves to fold-up the lower bracket 28, which simultaneously also causes the upper bracket 26 to move upward in the pivoting direction. The movements produced by both raising elements 40, 42 thus complement each other.

For example, the frame 48 is part of a frame of the sliding roof system 16 extending around the roof cutout 14.

In the upward direction H, the frame 48 has an integrally formed projection 50 which extends from the frame 48, in a direction opposite to the direction of travel F away from the frame 48.

The projection 50 is configured such that the stop 38 of the lower bracket 28 engages the projection in the pivoted-up position.

In other words, the pivoting movement of the lower bracket 26 in the upward direction H is limited by the abutment of the stop 38 on the projection 50, an accurate pivoting position being thus predetermined for the lower bracket 28.

The pivoting movement of the brackets 26, 28 from the lowered position to the pivoted-up position is explained below by way of example with reference to FIGS. 3a to 3c.

Figure 3A:
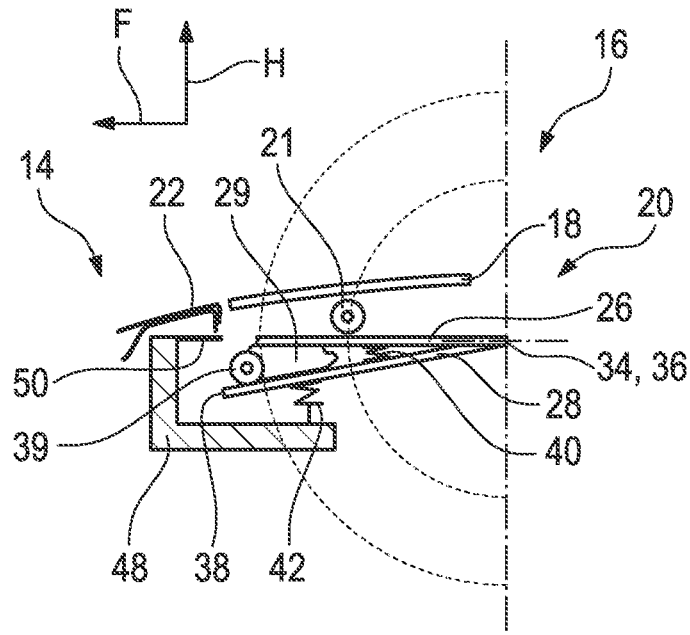
FIGS. 3a to 3e show schematic side views of the sliding roof system according to FIGS. 2a and 2b in different positions of the wind deflector.

FIG. 3a shows the sliding roof system 16 in the closed state in which the sliding roof is closed. Thus, the sliding roof cover 18 is planar with respect to the adjacent roof 12 of the motor vehicle 10.

In the closed state, the actuating element 21 urges the upper bracket 26 opposite to the upward direction H, thus applying a force greater than that of the first and the second raising elements 40, 42, so that the brackets 26, 28 remain in their lowered position.

Figure 3B:
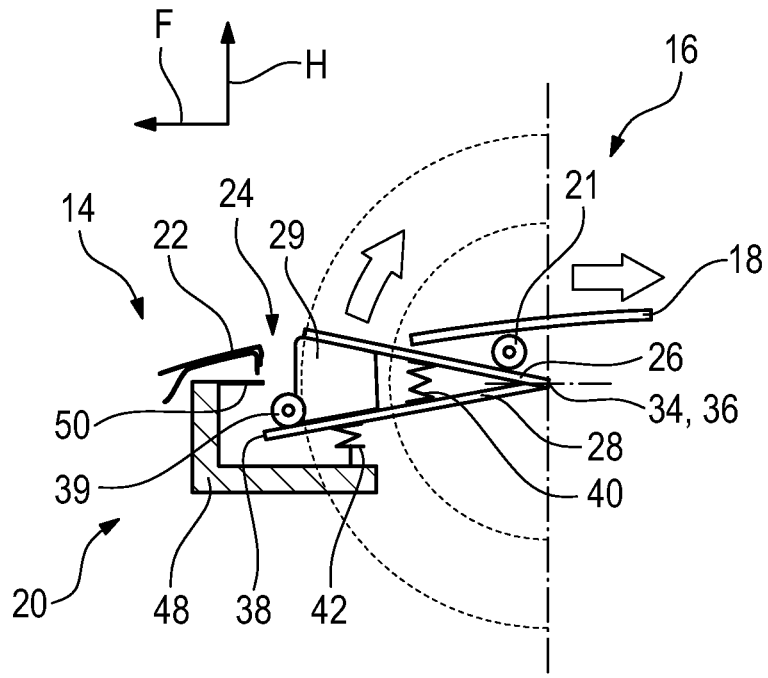

In FIG. 3b, the sliding roof cover 18 has been moved rearwardly opposite the direction of travel F, and the actuating element 21 is located in the position of FIG. 3b in the area of the pivot axes 34, 36.

The opening 24 is thus partially open, and the application of force to the upper bracket 26 by the first raising element 40 in the upward direction H causes the upper bracket 26 to pivot about the first pivot axis 34, i.e. in the direction of the pivoted-up position of the upper bracket 26. At the same time, the lower bracket 28 remains in the initial position, i.e. in the lowered position. This is achieved by the spring force of the first raising element 40 being greater than that of the second raising element 42.

The pivoting movement also simultaneously stretches the flow deflecting part 29, and in FIG. 3b it can be seen that the flow deflecting part 29 bridges the space between the upper bracket 26 and lower bracket 28. Once the flow deflecting part 29 is fully stretched, the force of the first raising element 40 no longer acts opposite to that of the second raising element 42 when the sliding roof cover 18 is moved even further rearward. Therefore, the second raising element 42 can now pivot the entire unit of lower and upper bracket 26, 28 upwards, the flow deflecting part 29 remaining completely tensioned during this pivoting.

Figure 3C:
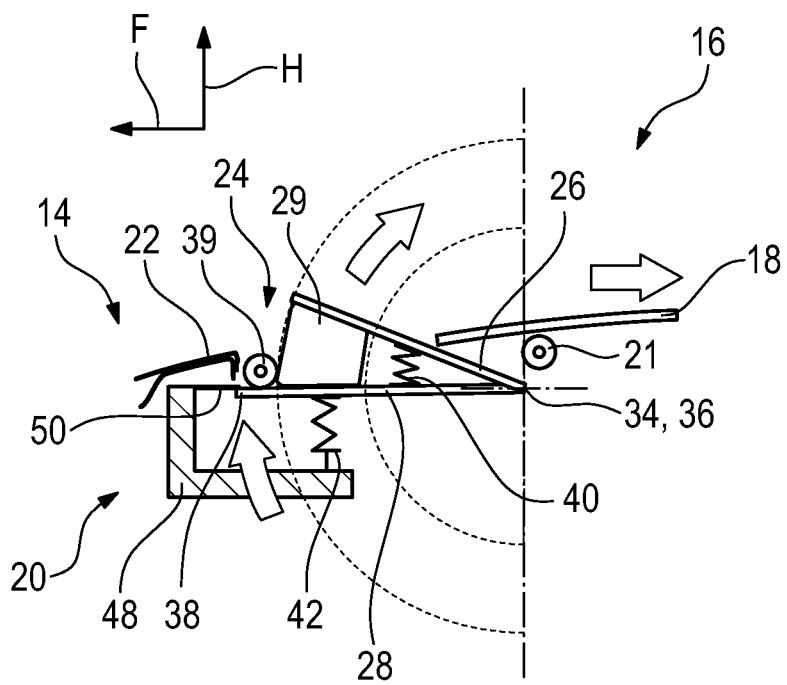

In contrast to FIG. 3b, in the position of FIG. 3c the sliding roof is opened even further opposite to the direction of travel F, so that the wind deflector 20 is now fully raised.

In the fully raised position, the lower bracket 28 rests against the projection 50 of the frame 48 via the stop 38.

In the raised position of the wind deflector 20, the flow deflecting part 29 extends diagonally upwards opposite to the direction of travel F between the brackets 26, 28, thus also between the corresponding central webs 30.

The sealing element 39 is arranged on the lower bracket 28 so as to rest against the front edge 22, and thus an air flow flowing in the direction opposite to the direction of travel F cannot enter the area between the lower bracket 28 and the front edge 22 of the roof 12. In the first embodiment, the air flow is prevented by the combination of the sealing element 39 and the pivotable lower bracket 28. In this way, there can also be no unpleasant noise or boom for the occupants of the motor vehicle 10 when the motor vehicle 10 moves in the direction of travel F. Therefore, the sliding roof system 16 and the wind deflector 20 improve the acoustics.

Figure 3D:
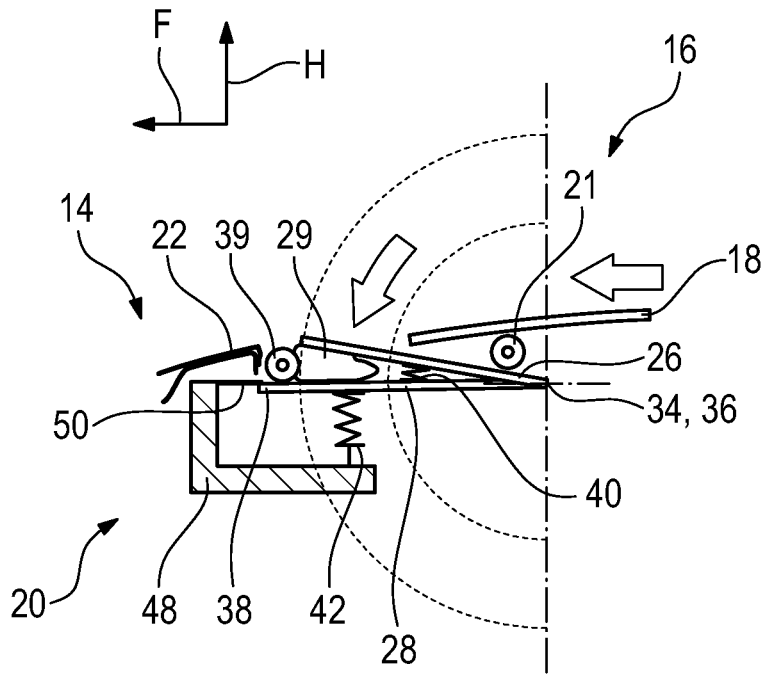
Figure 3E:
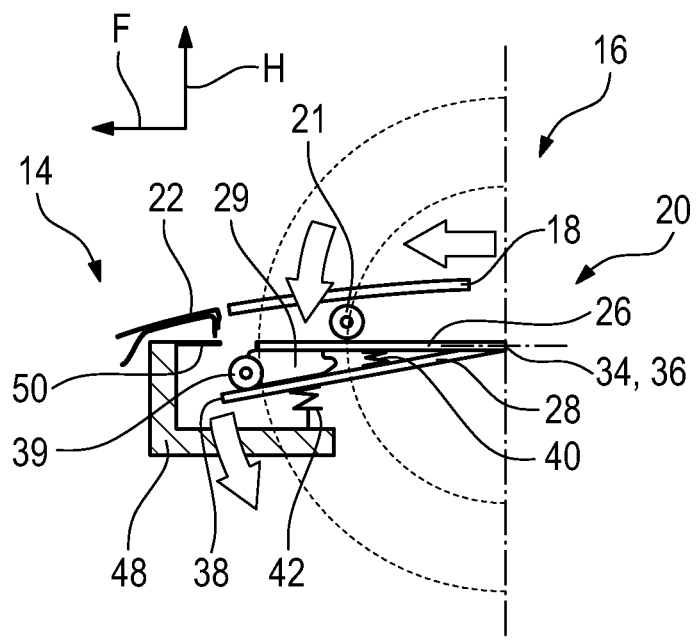

With reference to FIGS. 3d and 3e, the reverse movement, i.e., the adjustment of the wind deflector 20, is now described.

Compared with FIG. 3c, the sliding roof cover 18 has been moved forward in the direction of travel F in FIG. 3d, and the actuating element 21 engages the upper side of the upper bracket 26 in the upward direction H and pushes it downward in the opposite direction to the upward direction H.

As a result, the upper bracket 26 performs a counterclockwise downward pivoting movement (the lower bracket 28 remains in the same position as in FIG. 3c), and the flow deflecting part 29 is folded by this pivoting movement.

Thus, the actuating element 21 counteracts the raising force of the first raising element 40.

In the position of FIG. 3e, the sliding roof cover 18 is again in the fully closed position (corresponding to FIG. 3a). As a result of the movement of the sliding roof cover 18, both the upper bracket 26 and the lower bracket 28 perform a counterclockwise pivoting movement about the corresponding pivot axis 34, 36 and are again in the fully lowered position in FIG. 3e.

With reference to FIGS. 4a to 5b, two further embodiments of the wind deflector 20 are described below. These embodiments substantially correspond to the embodiment of FIGS. 2a to 3e, so that only the differences will be discussed below. Identical and functionally identical components are indicated by the same reference signs.

Figure 4A:
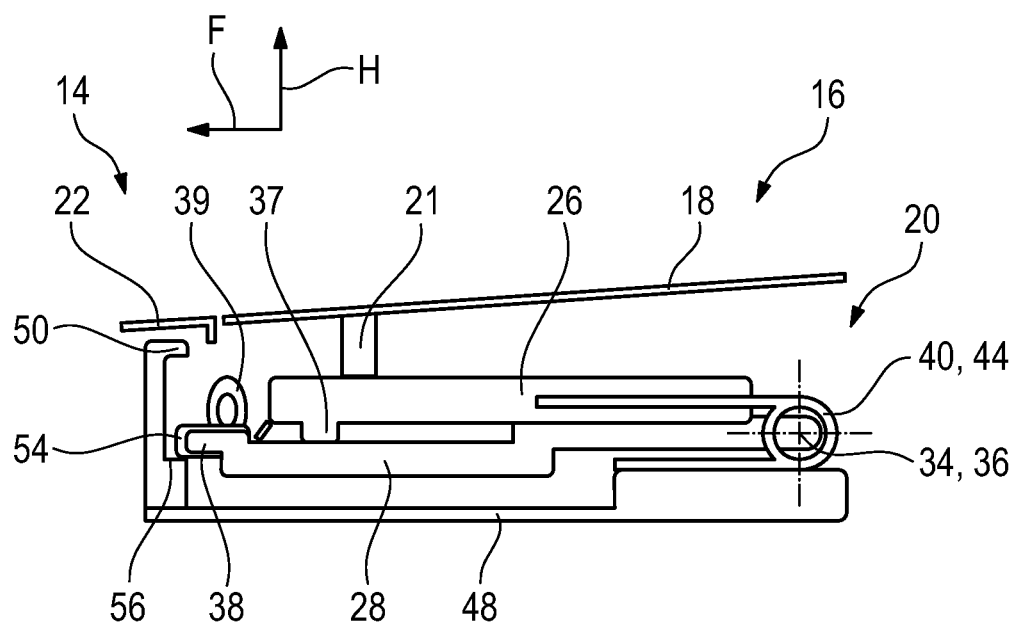
FIGS. 4a and 4b show side views of the sliding roof system of FIG. 1 with a wind deflector according to the invention in a second embodiment in the lowered state and in the raised state.
Figure 4B:
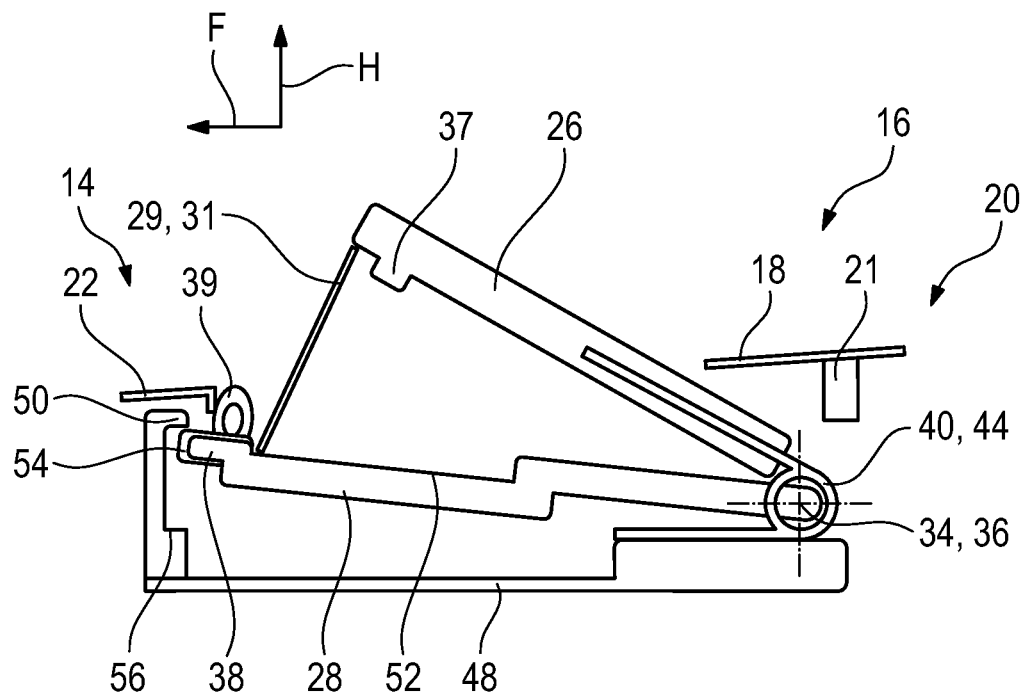

In the embodiment of FIGS. 4a and 4b, the wind deflector 20 has only a first raising element 40 and no second raising element 42.

The first raising element 40 is attached to the upper bracket 26 and supported on the frame 48.

Here, the upper bracket 26 is coupled to the lower bracket 28 via the flow deflecting part 29 so that a pivoting movement of the upper bracket 26 also results in a pivoting movement of the lower bracket 28.

Thus, if the upper bracket 26 is pivoted upward in the pivoting direction, the flow deflecting part 29 is first stretched, and then the flow deflecting part 29 couples the movement of the upper bracket 26 to the lower bracket 28 so that the lower bracket 28 is also pivoted upward in the upward direction H.

In contrast to the first embodiment, the lower bracket 28 has a recess 52 in which the flow deflecting part 29 is stowed in the lowered position of the wind deflector 20.

In addition, the upper bracket 26 also rests in the recess 52 via the extension 37 in the lowered position.

A further difference is that the stop 38 is configured to be damping.

More specifically, the stop has a damping element 54, for example a rubber layer, so that the abutment of the lower bracket 28 in the pivoted-up position is damped on the projection 50.

In addition, a step 56 is formed on the frame 48 on which the stop 38 rests in the lowered position (FIG. 4*a*).

Figure 5A:
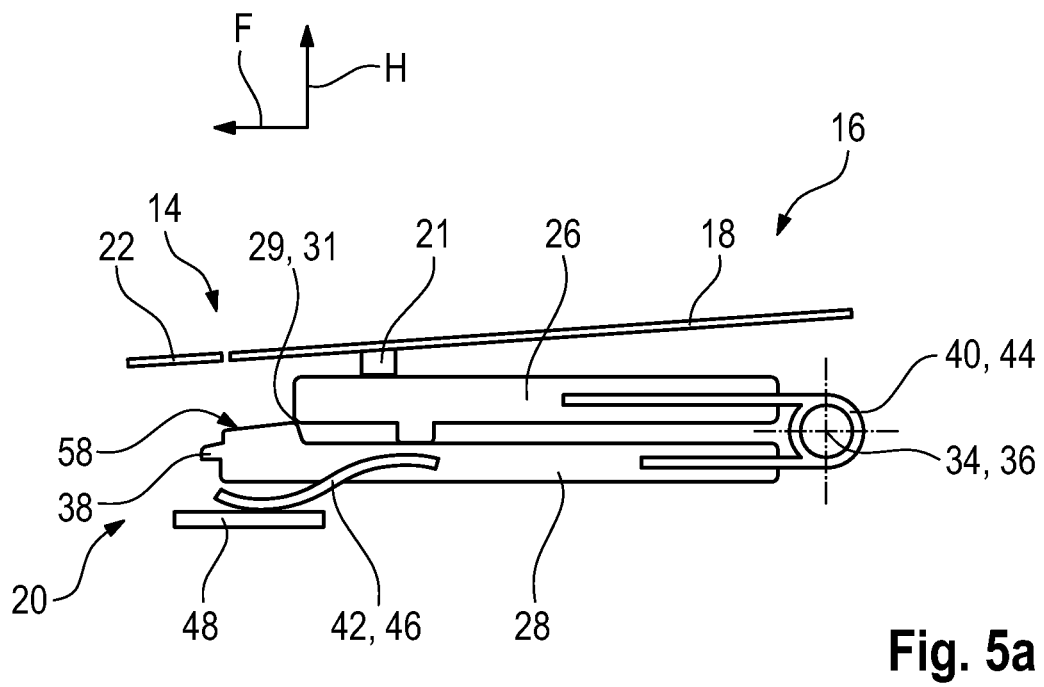
FIGS. 5a and 5b show side views of the sliding roof system of FIG. 1 with a wind deflector according to the invention in a third embodiment.

In contrast to the first embodiment, the wind deflector 20 of FIGS. 5*a* and 5*a* does not have a projection 50; rather, the stop 38 of the lower bracket 28 abuts directly against the front edge 22 of the roof 12 on the underside.

More specifically, the lower bracket 28 is formed in an area between the attachment point of the flow deflecting part and the stop 38 such that a surface 58 is directly adjacent to the front edge 22 of the roof cutout 14.

Thus, in the pivoted-up position (FIG. 5*b*), the lower bracket 28 is planar with the roof 12 of the motor vehicle 10, that is, with the outer skin of the motor vehicle 10, between the flow deflecting part 29 and the stop 38.

In this case, the stop 38 is of a nose-shaped design.

Figure 5B:
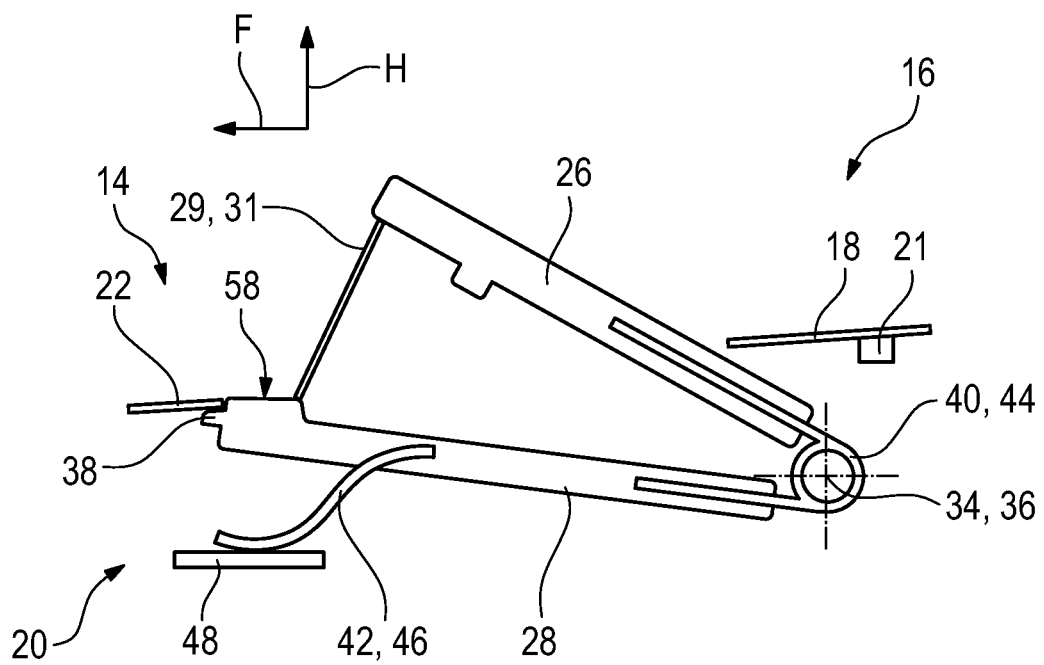

Additionally, in the embodiment of FIGS. 5*a* and 5*b*, the wind deflector 20 has no sealing element 39.

The invention claimed is:

1. A wind deflector for a sliding roof system, comprising:
   a pivotable upper bracket in a raised state of the wind deflector,
   a pivotable lower bracket in the raised state of the wind deflector, the pivotable upper and lower brackets each having a central web extending along a front edge of an associated roof cutout,
   a first elastic raising element,
   a frame, wherein the first elastic raising element is supported on the frame, and
   a flow deflecting part which is fastened to the two central webs and bridges a space between the central webs in the raised state of the wind deflector and extends obliquely upwards and opposite to a direction of travel between the central webs,
   wherein the pivotable upper and lower brackets are movable between a pivoted-up position and a lowered position,
   wherein the first elastic raising element is associated with the pivotable upper bracket and is configured to urge the pivotable upper bracket into the pivoted-up position, and
   wherein the pivotable lower bracket has a stop which abuts on a side of the frame in the pivoted-up state and fixes the pivoted-up positions of the two brackets.

2. The wind deflector according to claim 1, characterized in that the first elastic raising element is fastened to the pivotable upper bracket.

3. The wind deflector according to claim 1, characterized in that the two brackets have a common pivot axis.

4. The wind deflector according to claim 1, wherein the flow deflecting part is a wind deflector net.

5. The wind deflector according to claim 1, wherein the first elastic raising element is a spring.

6. The wind deflector according to claim 1, wherein the pivotable lower bracket is coupled to the pivotable upper bracket via the flow deflecting part upwards in the pivoting direction and is configured to be pivoted upwards by the pivotable upper bracket.

7. The wind deflector according to claim 1, wherein the wind deflector has a second elastic raising element which is associated with the pivotable lower bracket and is configured to urge the pivotable lower bracket into the pivoted-up position.

8. The wind deflector according to claim 7, wherein the second elastic raising element is fastened to the pivotable lower bracket.

9. The wind deflector according to claim 1, wherein the stop is configured to be damping.

10. The wind deflector according to claim 1, wherein the sliding roof system is inserted into the roof cutout of a motor vehicle.

11. The wind deflector according to claim 10, wherein in the pivoted-up position, the pivotable lower bracket abuts on an underside against the front edge of the roof cutout.

12. The wind deflector according to claim 11, wherein in the pivoted-out position opposite to the direction of travel (F), the pivotable lower bracket directly adjoins the front edge of the roof cutout.

13. The wind deflector according to claim 12, wherein in the pivoted-out position opposite to the direction of travel, the pivotable lower bracket additionally adjoins an outer skin vertically in an area of the front edge.

14. The wind deflector according to claim 1, wherein a sealing element is arranged on the pivotable lower bracket and is arranged between the flow deflecting part and the front edge of the roof cutout in the pivoted-up position of the pivotable lower bracket, the sealing element reducing an air flow between the pivotable lower bracket and the roof cutout.

15. The wind deflector according to claim 7, wherein the second elastic raising element is supported on the frame.

* * * * *